US012319200B2

(12) United States Patent
Bizal et al.

(10) Patent No.: US 12,319,200 B2
(45) Date of Patent: Jun. 3, 2025

(54) LIGHTING DEVICE FOR A VEHICLE INTERIOR, METHOD FOR PRODUCING SAME, AND INTERIOR FITTING PART COMPRISING SUCH A LIGHTING DEVICE

(71) Applicant: HELLA GmbH & Co. KGaA, Lippstadt (DE)

(72) Inventors: Ana Bizal, Domzale (SI); Juergen Griebel, Steinen (DE); Robin Hofner, Heilbronn (DE); Simon Luetzelschwab, Rheinfelden (DE); Kai Saaler, Hasel (DE); Heiko Schoene, Zell im Wiesental (DE); Roland Schwarz, Todtnau (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/386,126

(22) Filed: Nov. 1, 2023

(65) Prior Publication Data

US 2024/0059217 A1    Feb. 22, 2024

Related U.S. Application Data

(63) Continuation of application No. PCT/EP2022/060023, filed on Apr. 14, 2022.

(30) Foreign Application Priority Data

May  1, 2021   (DE) ..................... 10 2021 111 305.9
Mar. 4, 2022   (DE) ..................... 20 2022 101 204.0

(51) Int. Cl.
*B60Q 3/62*    (2017.01)
*B60Q 3/51*    (2017.01)
(Continued)

(52) U.S. Cl.
CPC ................. *B60Q 3/66* (2017.02); *B60Q 3/51* (2017.02); *B60Q 3/54* (2017.02); *B60Q 3/62* (2017.02);
(Continued)

(58) Field of Classification Search
CPC . B60Q 3/54; B60Q 3/64; B60Q 3/745; B60Q 3/62; G02B 6/0023; G02B 3/0028
(Continued)

(56) References Cited

U.S. PATENT DOCUMENTS 8,915,001 B2    12/2014  Breunig et al.
2020/0284973 A1*  9/2020  Andersson ........... G02B 6/0078

FOREIGN PATENT DOCUMENTS

CN        209325659 U  *  8/2019  ............. F21S 41/24
DE         10032927 A1      1/2002
(Continued)

OTHER PUBLICATIONS

International Search Report dated Aug. 3, 2022 in corresponding application PCT/EP2022/060023.

*Primary Examiner* — Laura K Tso
(74) *Attorney, Agent, or Firm* — Muncy, Geissler, Olds & Lowe, P.C.

(57) ABSTRACT

To allow an easily producible lighting device that manages with few components and enables an efficient, desired light distribution in an interior space, the provided method and device includes a light guide with a longitudinal transport section and at least one transverse transport section. The longitudinal transport section has at least one light entry surface, arranged transversely with respect to the longitudinal extension of the longitudinal transport section, for coupling light into the longitudinal transport section, and a light exit section along the longitudinal extension. The transverse transport section has a flat design, and is connected to the
(Continued)

longitudinal transport section at least one first narrow side. The transverse transport section also has secondary deflection elements at which the coupled-in light is deflected in such a way that the light exits at the opposite broad sides.

19 Claims, 12 Drawing Sheets

(51) Int. Cl.
| | |
|---|---|
| *B60Q 3/54* | (2017.01) |
| *B60Q 3/64* | (2017.01) |
| *B60Q 3/66* | (2017.01) |
| *B60Q 3/74* | (2017.01) |
| *B60Q 3/85* | (2017.01) |
| *F21V 8/00* | (2006.01) |

(52) U.S. Cl.
CPC ............... *B60Q 3/64* (2017.02); *B60Q 3/745* (2017.02); *B60Q 3/85* (2017.02); *G02B 6/0023* (2013.01); *G02B 6/0028* (2013.01)

(58) Field of Classification Search
USPC ......................................................... 362/448
See application file for complete search history.

(56) References Cited

FOREIGN PATENT DOCUMENTS

| | | |
|---|---|---|
| DE | 102008008180 A1 | 8/2009 |
| DE | 102009017363 A1 | 10/2010 |
| DE | 102014200474 A1 | 7/2015 |
| DE | 202016003741 U1 | 9/2017 |
| DE | 102016219530 A1 | 4/2018 |
| DE | 102018219853 A1 | 5/2020 |
| GB | 2435937 A | 9/2007 |

* cited by examiner

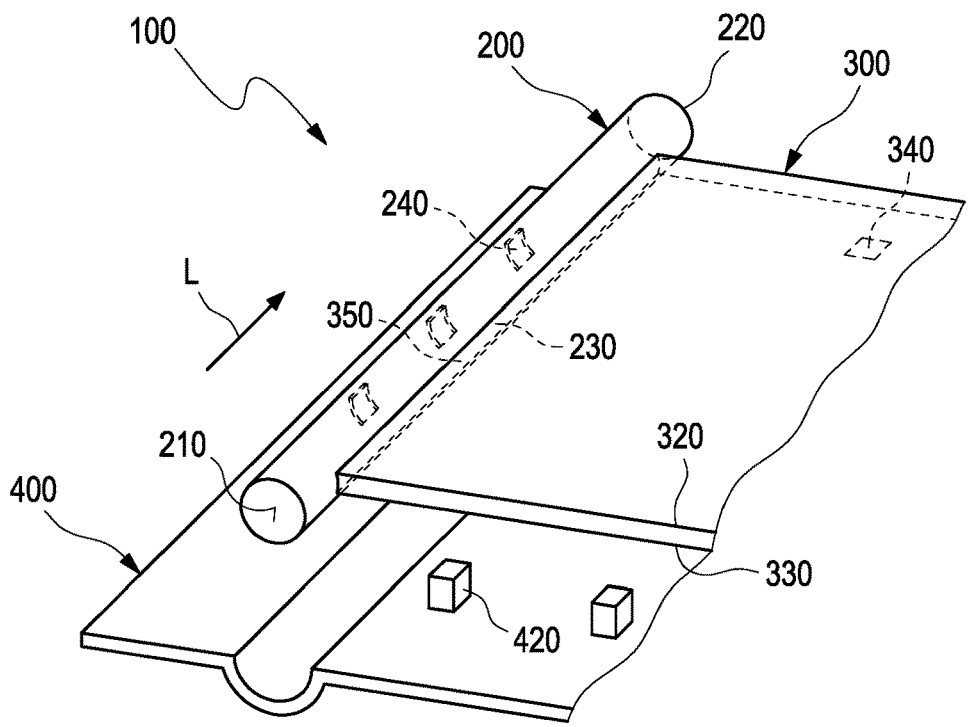
Fig. 6 a
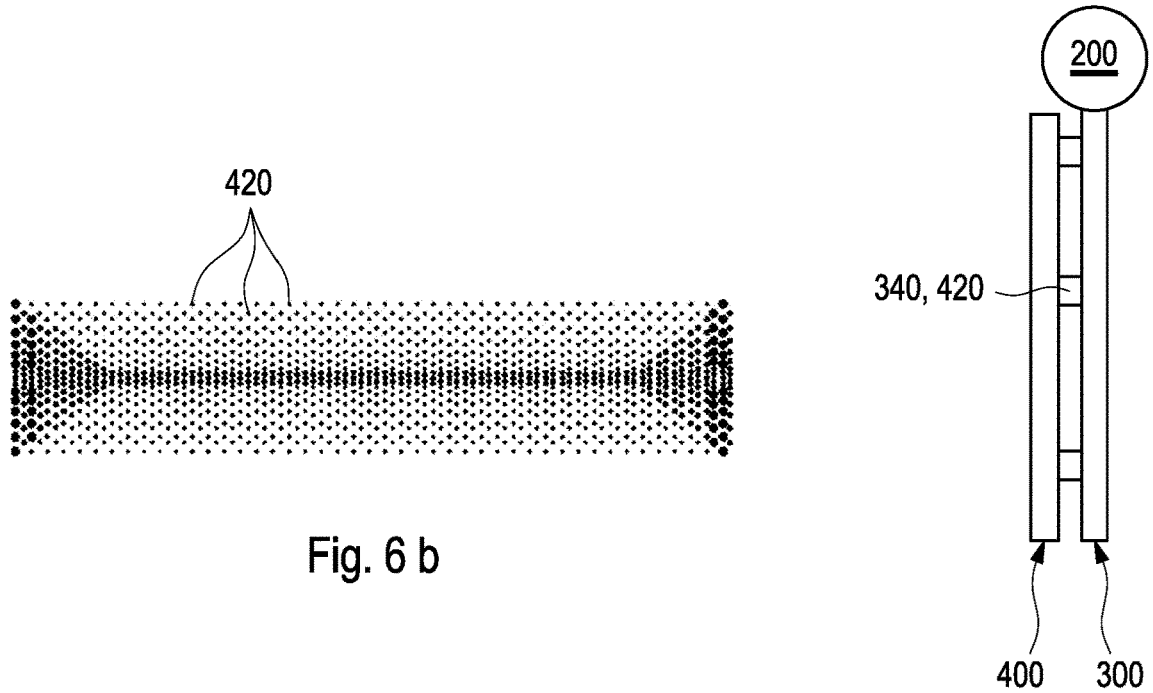
Fig. 6 b
Fig. 6 c (A - A)

LIGHTING DEVICE FOR A VEHICLE INTERIOR, METHOD FOR PRODUCING SAME, AND INTERIOR FITTING PART COMPRISING SUCH A LIGHTING DEVICE

This nonprovisional application is a continuation of International Application No. PCT/EP2022/060023, which was filed on Apr. 14, 2022, and which claims priority to German Patent Application No. 10 2021 111 305.9, which was filed in Germany on May 1, 2021, and German Patent Application No. 20 2022 101 204.0, which was filed in Germany on Mar. 4, 2022, which are all herein incorporated by reference.

BACKGROUND OF THE INVENTION

Field of the Invention

The invention relates to a lighting device for illuminating an interior space, comprising a light guide with at least one longitudinal transport section and at least one transverse transport section for guiding light. The at least one longitudinal transport section has a light entry surface, situated transversely with respect to the longitudinal extension of the longitudinal transport section, for coupling light of at least one light source into the longitudinal transport section, and along the longitudinal extension has at least one light exit section. The at least one transverse transport section has a flat design with a first broad side, a second broad side opposite the first broad side, and narrow sides. The longitudinal transport section has a circumferential surface at which the coupled-in light is guided in the longitudinal extension via total reflection in the longitudinal transport section. The light couples into the transverse transport section via the at least one light exit section, and is guided in the transverse transport section, between the oppositely situated broad sides of the transverse transport section, by total reflection. The transverse transport section has secondary deflection elements at which the light that is coupled into the transverse transport section is deflected in such a way that it exits from the surface, spanned by the flat transverse transport section, at at least one of the oppositely situated broad sides.

The invention further relates to a method for producing this lighting device. The invention further relates to an interior fitting part that includes such a lighting device.

Description of the Background Art

For interior space illumination, in particular illumination of vehicle interiors, the LED has become the standard in lighting technology. The RGB LEDs represent a further development of the monochromatic LEDs, and with the three primary colors provide many options for ambient lighting. The efforts to employ RGB LED technology are focused not only on optimizing the homogeneity of flat light guides, in particular in door moldings or instrument panels, which together with materials such as perforated leather or textiles result in dynamic lighting scenarios, but also an energy-efficient use of this technology.

The invention described here is not applicable to the field of exterior lighting for motor vehicles, since this field is subject to regulatory requirements regarding light density homogeneity and parallelized light, and corresponding stipulations are therefore imposed.

For example, a motor vehicle including a light guide is known from DE 20 2016 003 741 U1. The light guide is used to indirectly illuminate the interior space of the motor vehicle, using a lighting unit. For coupling the light into the light guide, an end-face side of the flat light guide is used as a coupling section. To illuminate the interior space of the motor vehicle, light is decoupled from the light guide, which is designed as a film, by means of a decoupling structure so that flat illumination can take place.

In these types of "sidefire" arrangements, it is disadvantageous that uniform decoupling of light from the film is possible only up to a limited distance from the light source, i.e., from an edge of the particular film. Since light cannot be radiated into the film light guide from the side or from the edge with an arbitrary width or depth, an achievable size of the film is limited, at least when uniform brightness over the surface to be illuminated is sought. The efficiency of the lighting unit is thus disadvantageously limited. This arrangement is also not suitable for specialized installation requirements. A further disadvantage is found when the light is coupled in using RGB LEDs, since the light is not sufficiently well mixed in the film before it exits.

A lamp for a motor vehicle is known from DE 20 2016 100 986 U1, in which the illuminant, a rod-shaped light guide, and a flat light guide cooperate optically to enable flat illumination.

SUMMARY OF THE INVENTION

It is therefore an object of the invention to provide an easily producible device, which manages with few components, has small installation space requirements, and at the same time has a low weight to allow a desired light distribution in an interior space as efficiently as possible. A further object of the invention is to allow simple, rapid, and economical fastening of the lighting device and thus ensure a specified homogeneous and flat light distribution in the interior. A further object of the invention is to provide an interior fitting part having a lighting unit of the type mentioned at the outset.

Due to the transverse transport section being connected to the longitudinal transport section along the longitudinal extension via at least one light exit section, the advantage is achieved that the light can propagate chaotically in the longitudinal transport section and thus be mixed, so that only homogeneous and well-mixed light passes into the transverse transport section. As a result of the transverse transport section having a flat design and having narrow sides, for illuminating an interior space a surface area light results, which may also be used as a contour light. Arranging the at least one light source at a light entry surface situated transversely with respect to the longitudinal extension results in the advantage that the light is coupled in at the end-face surface of the longitudinal transport section, and a flexible installation arrangement of the lighting device may be achieved. A flexible installation arrangement means that the light source together with its electrical connections may be situated adjacent to a limited installation space.

It is advantageously provided that the at least one transverse transport section has secondary deflection elements that allow a dedicated optical system for the interior space illumination to be provided, not only for homogeneous illumination, but also to obtain zonal illumination and dynamic lighting scenarios.

As a result of the longitudinal transport section and the transverse transport section being designed in one piece and made of a single material, this results in the advantage that not only may the lighting device be produced from the same material in an injection molding process, but also that the light exit section is provided as a smooth transition. The passage of light from the longitudinal transport section to the transverse transport section takes place without interfering optical influences, and the lighting device has a higher efficiency. The lighting device is produced using an injection molding process in an economical and time-saving design.

As a result of the transverse transport section being designed as a flat film and being integrally formed on the longitudinal transport section, the transverse transport section may advantageously be processed as a prefabricated purchased part.

Multiple spaced-apart transverse transport sections arranged in a strip shape are advantageously situated at the longitudinal transport section in the longitudinal extension, so that in addition to material and weight savings, 3D shaping may also be made possible.

The transverse transport section is advantageously situated in a radial plane relative to the center axis of the longitudinal transport section. Depending on the installation situation of the lighting device, it is advantageous to integrally form the transverse transport section centrally on the longitudinal transport section in the longitudinal extension in order to make use of the space, for example below the transverse transport section, for fastening. In another installation situation, it may be advantageous to arrange the transverse transport section in a tangential plane relative to the circumferential surface of the longitudinal transport section. A lighting device that lies flat and that is used for simple and also space-saving installation is thus provided.

The at least one light source is advantageously designed as a single-color or multi-color LED, in particular as an RGB LED. As a result of using an LED as the light source, an energy-saving lighting device may be provided that is able to illuminate an entire surface using only one LED. In particular for applications in the field of electromobility, even small energy savings have an advantageous effect on the cruising range of the vehicle. The RGB LED radiates colored light into the longitudinal transport section, which propagates chaotically and passes into the transverse transport section as mixed light. A homogeneously colored light is thus available to the transverse transport section, and for illuminating the interior space is decoupled from the transverse transport section. In addition, use of one or more RGB LEDs and the at least one longitudinal transport section for mixing the multi-color LEDs provides an optical system having numerous further options, since the entire color space of the LEDs used is available as a color palette for specific settings.

It is advantageous for a first light source to be situated at a first light entry surface, and for a second light source to be situated at a second light entry surface in the longitudinal extension, on the end side of an end region of the at least one longitudinal transport section for coupling light, or for the end region to be designed as a reflecting mirror. This arrangement provides even more intense illumination of the interior space to be illuminated.

As a result of the longitudinal transport section having at least one first light entry surface with an associated first light source, and including a supply arm having a first end at which an additional light entry surface with an associated additional light source is situated, and whose second end merges into the longitudinal transport section, further light is coupled into the longitudinal transport section and thus into the flat transverse transport section. It is thus possible not only to adjust a more intense light distribution, but also to provide an arrangement that is independent of the installation space. The light source of the supply arm may be situated farther from the transverse transport section if this is necessary due to the installation space.

The longitudinal transport section advantageously has primary deflection elements at which the light that is guided in the longitudinal transport section is deflected in such a way that it couples into the transverse transport section via the at least one light exit section. The primary deflection elements may be situated in the volume of the longitudinal transport section or also at the circumferential surface. This results in the advantage that the passage of light may be controlled in a targeted manner in order to influence the light distribution in the transverse transport section.

The primary deflection elements in the longitudinal extension at the circumferential surface of the longitudinal transport section can be advantageously situated in the plane of the transverse transport section, at the circumferentially opposite side of the at least one light exit region, so that an efficient passage of light between the two transport sections takes place. As a result of the primary deflection elements having a higher density with increasing distance from the light coupling surface, this results in the advantage that the decreasing light intensity along the longitudinal transport section is compensated for, and for the observer the perception of a homogeneously lighted surface is thus enhanced. In the vicinity of the light entry surface, the light intensity is stronger and the density of the primary deflection elements is lower. To the extent that the light intensity along the longitudinal extension of the longitudinal transport section decreases, the density of the primary deflection elements increases to ensure a uniform passage of light into the transverse transport section.

The longitudinal transport section in the longitudinal extension can have a cross-sectional change such that the cross section continuously decreases toward the end region, or decreases up to a predetermined location and at the end region once again increases, or has a tapered design only in the end region. The light that responds to the cross-sectional changes also behaves in a corresponding manner. As a result of a continuously decreasing cross-sectional area being achieved over the length of the longitudinal transport section, the light in the end region may pass into the transverse transport section with the same intensity as in the initial region of the coupling. As a result of a partial cross-sectional decrease taking place over an arbitrary region in the longitudinal extension, the light at this narrowed location is coupled into the transverse transport section with a corresponding intensity. These changes in the cross-sectional area over the length of the longitudinal transport section result in a targeted passage of light into the transverse transport section.

A further longitudinal transport section can be situated at the second narrow side opposite the first narrow side of the transverse transport section, the further longitudinal transport section having at least one further light entry surface, situated transversely with respect to the longitudinal extension of the further longitudinal transport section, for coupling light of at least one further light source into the longitudinal transport section, and along its longitudinal extension having at least one light exit section that is connected to the second narrow side of the transverse transport section. The light intensity and also the dynamic light behavior in the transport section are enhanced with this arrangement. A high light intensity is obtained when a total of four light sources are arranged at the two longitudinal transport sections in such a way that light is coupled via the light entry surface into the transverse transport section from each side. In addition, one or more supply arms with additional light entry surfaces and corresponding light sources may also be provided. Since all light sources are combined at one electrical connection, this results in a reduction of components.

As a result of the transverse transport section having fastening elements that cooperate with central fastening elements of a support in such a way that the transverse transport section and the support are connectable to one another in a zone of the transverse transport section having a low light intensity distribution, this results in the advantage that the connection takes place specifically in the region or zone that plays a subordinate role for the light distribution. This zone has been calculated beforehand based on a light simulation, and is different for various designs on account of structural requirements. Since a lower light intensity prevails in the zone regions, the central fastening elements, which are fastened to the fastening elements of the transverse transport section by clips, for example, do not interfere with the light guidance process.

It is advantageous when the transverse transport section or the support has decentralized fastening elements, so that the transverse transport section and the support are mechanically and integrally fixedly joinable to one another.

At least one decentralized fastening element can be designed in the form of a secondary deflection element. This has the advantage that all decentralized fastening elements are also secondary deflection elements, and due to this dual function the fastening has no effects on the light guidance in the transverse transport section or on the light decoupling. If the lighting device is exposed to elevated temperatures, which may occur in an interior space, the plastic material of which the transverse transport section is made does not lose rigidity. This may result in shifting of the fastening elements. Since the fastening elements are congruent with the secondary deflection elements, this has no negative effects on the light guidance, even if the lighting device loses dimensional stability, for example due to heat in the interior space of a vehicle.

Electronic components, in particular at least one sensor and a heating wire, can be situated in and/or at the transverse transport section. The lighting device may thus fulfill multiple functions, which otherwise would be provided by separate components in the vehicle. This results not only in weight savings, but also in more comfort for the user.

The advantage of very efficient light intermixing results from the longitudinal transport section having a first subsection and a second subsection that is connected in series with the first subsection, and the first subsection being situated between the at least one light entry surface and the light exit section, and the second subsection extending along the light exit section, and the first subsection being designed as a supply line section with a circumferential surface, at which the light coupled into the supply line section via the light entry surface is guided by total reflection in such a way that it is relayed into the second subsection, and from there passes through the light exit section and into the transverse transport section. The first subsection has neither primary deflection elements nor light passage sections at its circumferential surface. The coupled-in light is thus homogeneously intermixed within the first subsection by total reflection. Specifically for ambient lighting using color components, it is important that one color from the surface area light does not dominate. Therefore, for RGB LEDs having the different color components it is essential that the color components are homogeneously intermixed before the light passes into the transverse transport section.

At least one broad side of the transverse transport section can have a light exit surface that is coated with a first layer which for generating a light pattern is light-permeable in areas, the first layer at its side facing away from the light exit surface of the transverse transport section being coated with a second layer made of a metallic-looking material that has a light-permeable design and covers light-permeable areas of the first layer. In the unilluminated state, the continuous second layer made of the metallic-looking material is visible to the observer, and only when the lighting device radiates light is the pattern of the first layer visible. The metallic-looking material has the optical appearance of a metal material, which may be a coating or may have a lacquer basis.

As a result of the interior fitting part having at least one decorative layer, which is light-permeable in areas, at its surface facing the vehicle interior in the installed state, and for backlighting the decorative layer the transverse transport section being situated at the rear side of the decorative layer facing away from the vehicle interior, this results in the advantage that ambient lighting of the interior space of a vehicle may be provided which allows a homogeneous appearance. Large-surface backlighting is advantageously brought about which blends into the optics of the interior trim, without interrupting or disturbing the harmonious overall appearance.

The decorative layer advantageously can comprise a fabric, and in particular is designed as a textile layer. In addition, the decorative layer may be designed as a perforated leather layer or synthetic leather layer. This results in numerous options for adapting the specified interior design of a vehicle. The interior fitting part with the lighting device thus fits into the predetermined structures of the interior trim. In the switched-off state, the lighting device is concealed by the decorative layer and therefore is not visible from the inside of the vehicle. When the lighting unit is switched on at night, the geometry of the decorative layer is visible due to the flat backlighting. The surface facing the vehicle interior in the position of use preferably has a three-dimensional shape that is different from a plane.

As a result of the interior fitting part being a side wall for a vehicle interior, in particular a door mirror for a vehicle door, the entire surface of the vehicle door is advantageously flatly backlit without interruptions. A wide variety of color designs are made possible by using variously colored RGB lighting. Depending on the application, patterns of strips, points, or backlighting over the entire surface may be created without objectionable hot spots, since homogeneous illumination is made possible.

The advantages of the method for producing a lighting device correspond to the advantages stated above with regard to the lighting device according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 1a to 1d show various geometric examples and arrangements,

FIGS. 6a to 6c show a further example according to FIG. 5,

FIG. 9a shows an example according to FIG. 8,

FIG. 9b shows a cross-section of the line A-A in FIG. 9a, and

DETAILED DESCRIPTION

Figure 1:
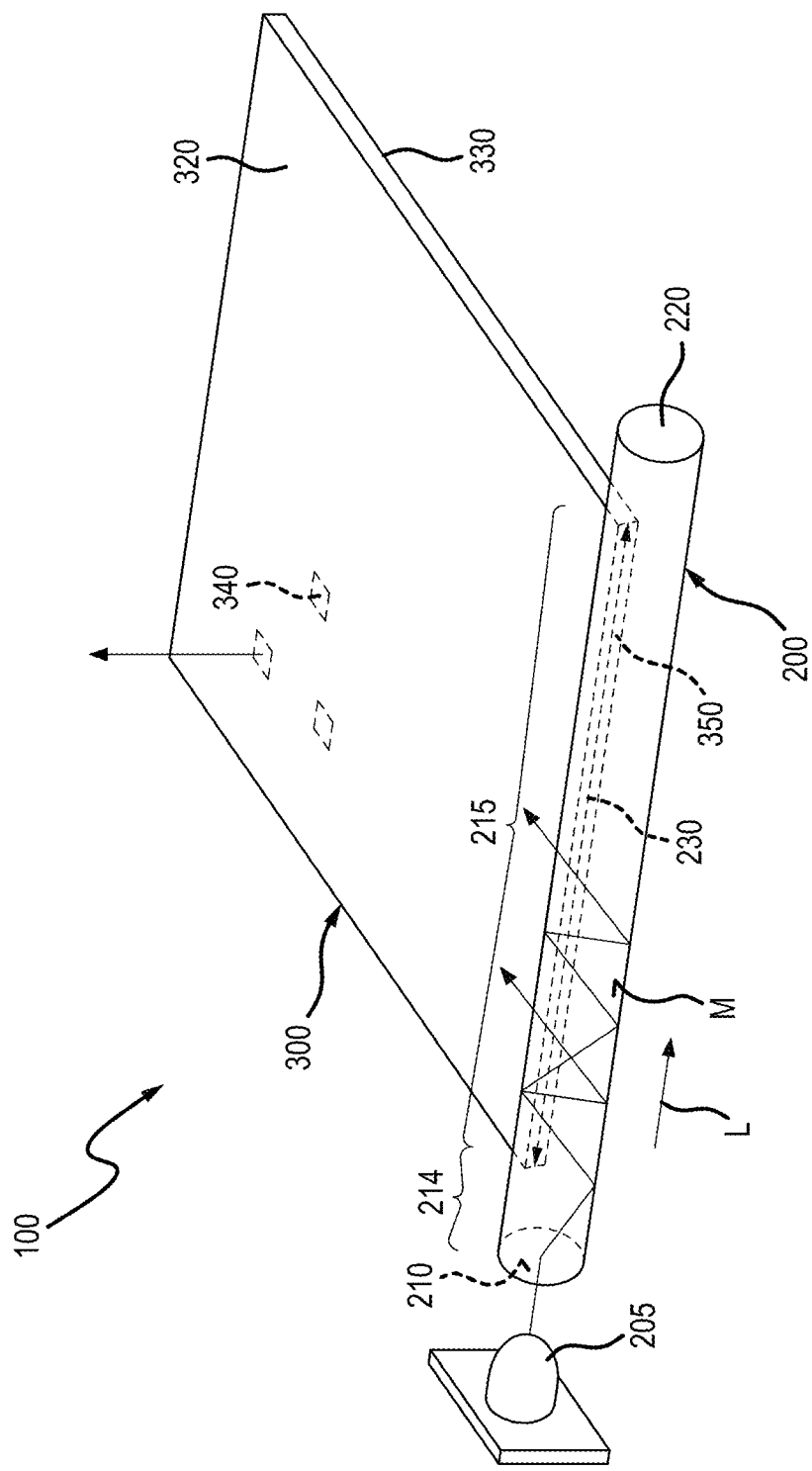
FIG. 1 shows a perspective view of the lighting device.
Figure 1:
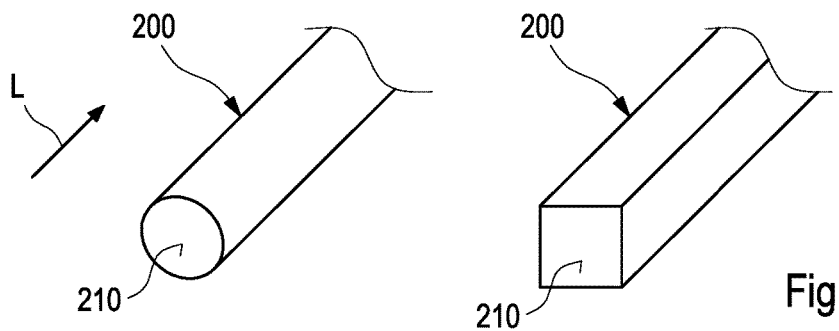
Figure 1:
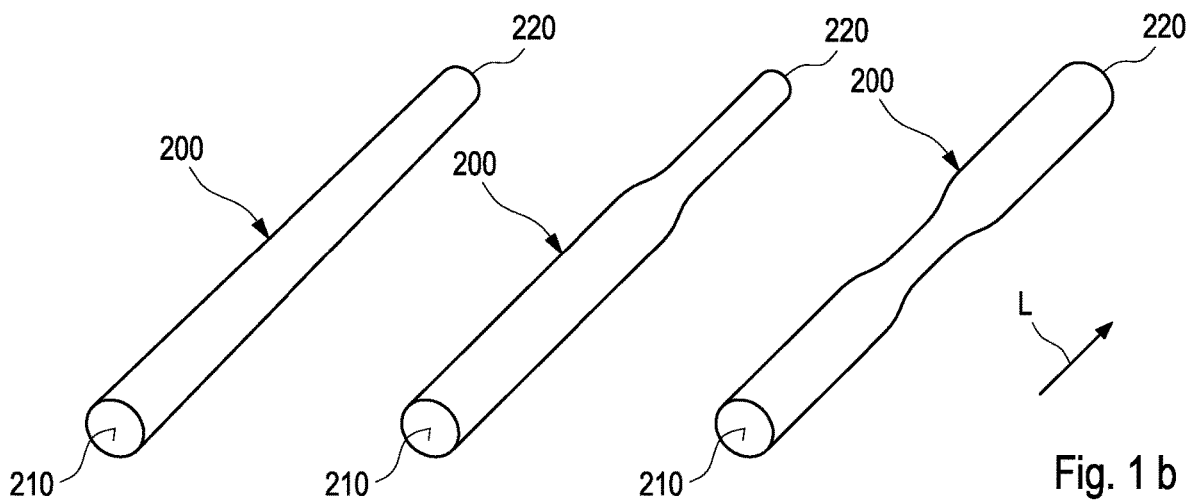
Figure 1:
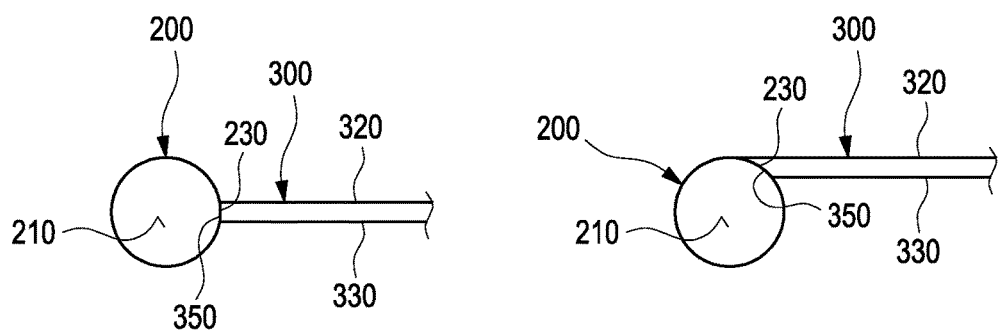
Figure 1:
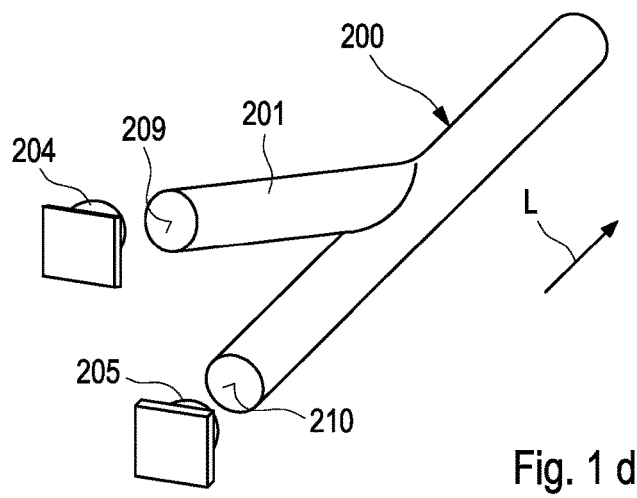

The lighting device illustrated in FIG. 1 is collectively denoted by reference numeral 100, and comprises a longitudinal transport section 200 and a transverse transport section 300 connected thereto. The longitudinal transport section 200 extends from a light entry surface 210 toward an end region 220 that faces away from the light entry surface 210. The transverse transport section 300 protrudes transversely along this longitudinal extension L.

The transverse transport section 300 extends flatly, and has a first broad side 320, a second broad side 330 opposite thereto, and correspondingly circumferential narrow sides. A broad side, in the present exemplary embodiment the first broad side 320, is designed in such a way that light may exit into an interior space, while the opposite broad side, in the present case the second broad side 330, faces away from the interior space and may be used for fastening to a support, for example. In this exemplary embodiment, the transverse transport section 300 having a narrow side 350 at a light exit section 230 is connected to the longitudinal transport section 200 and protrudes transversely from same. This connection may be based on the same materials when both sections 200, 300 are produced, using an injection molding process, from a lightweight, transparent plastic material such as PC or PMMA, for example, or may have an integrally joined design when the longitudinal transport section 200 has been molded onto the transverse transport section 300. The transverse transport section 300 may be prefabricated from a material such as PC or PMMA, for example. Secondary deflection elements 340 are situated, on an application-specific basis, in the transverse transport section 300 in the so-called film, and also in the transverse transport section 300 which is injection-molded from a single material, so that the light is decoupled from a broad side of the transverse transport section 300 at the desired locations. If the lighting device 100 is produced in the injection molding process from a single material, the secondary deflection elements 340 may already be integrated into the mold. In this illustration, the secondary deflection elements 340 are situated at the second broad side 330 facing away from the interior space, but may also be introduced inside, i.e., within the volume of the transverse transport section 300. In this one-sided coupling of the light into the transverse transport section 300, the film hangs loosely and flexibly at the longitudinal transport section 200, and may be flexibly applied in the interior space.

The light of a first light source 205 is coupled into the light entry surface 210 of the longitudinal transport section 200, and propagates within the longitudinal transport section 200 in the direction of the longitudinal extension L by total reflection at the circumferential surface M. In this exemplary embodiment, the light propagates from the light entry surface 210 to the end region 220. Due to the transverse transport section 300 being connected, at a narrow side 350 along the longitudinal extension L, to the longitudinal transport section 200, a light exit section 230 results at which the coupled-in light exits from the longitudinal transport section 200 and enters into the transverse transport section 300. In the transverse transport section 300 the light is guided between a first broad side 320 and a second broad side 330 opposite thereto, since here as well the light is subject to total reflection. Secondary deflection elements 340 are situated in the transverse transport section 300 for targeted decoupling of the light. In this illustration, the deflection elements 340 are situated at the second broad side 330 facing away from the interior space, so that the light exits through the first broad side 320 and is coupled into the interior space to be illuminated. The longitudinal transport section 200 is not limited to the linear pattern illustrated here, and may also have a curved pattern.

The first light entry surface 210, as well as the further light entry surfaces 209, 211, 212, and 213, are designed in such a way that they are able to receive the greatest possible amount of light from the respectively associated light source. Each of the light sources may be designed as a single-color or multi-color LED light source. If an RGB LED is used as a punctiform light source, in order to ensure a homogeneous appearance it is necessary to deliver only well-mixed light into the interior space to be illuminated. This is achieved by a first subsection 214 of the longitudinal transport section 200, which is situated between the light coupling surface 210 and the beginning of the light passage section 230, and by a second subsection 215 of the longitudinal transport section 200, which extends along the light exit section 230. As a result of the light from the RGB LED first being mixed with its color components in the first subsection of the longitudinal transport section 200 by total reflection at the circumferential surface, and then also being mixed in the second subsection by total reflection at the circumferential surface M, only homogeneous, well-mixed light subsequently passes into the transverse transport section. The entire color space of the LED may thus be used as a color palette, since all color components are homogeneously intermixed before the light passes into the transverse transport section.

The geometric cross-sectional shapes of the longitudinal transport section 200 are illustrated in FIG. 1a. Depending on the requirements and the installation situation of the longitudinal transport section 200, these shapes may have various designs, such as circular, oval, rectangular, or square. The diameter of the longitudinal transport section 200 is in particular between 1 mm and 10 mm, and preferably between 2 mm and 5 mm. The diameter is designed as a function of the distance that the light has to cover. In addition, the diameter of the longitudinal transport section 200 is determined as a function of the thickness of the transverse transport section 300. The quantity of light that passes through by means of the light exit section 230 may be regulated via the geometry of the longitudinal transport section 200 and the transverse transport section 300.

FIG. 1b shows the longitudinal transport section 200 as it is subjected to a cross-sectional area change in the longitudinal extension L. Starting from the light entry surface, in the present case starting from the first light entry surface 210 as an example, the cross-sectional area in the longitudinal extension L may have a design that monotonically tapers toward the end region 220. Another embodiment provides that the cross-sectional area does not taper until in the end region 220. In addition, FIG. 1b shows a preferred embodiment in which the tapering of the longitudinal transport section 200 takes place approximately in the middle between the first light entry surface 210 and the end region 220. At this narrow point, at which the cross-sectional area is the smallest, the light is coupled into the transverse transport section 300 with a greater intensity. The extension of the longitudinal transport section 200 may also have a curved pattern.

FIG. 1c illustrates the arrangement of the transverse transport section 300 at the longitudinal transport section 200. The transverse transport section 300 with its two broad sides 320, 330, in the longitudinal extension L of the longitudinal transport section, may be centrally situated with its first narrow side 350 at the light exit section 230 of the longitudinal transport section 200. In another embodiment, the transverse transport section 300 may be situated at the longitudinal transport section 200 so that the two sections form a plane, which is advantageous for an installation of the lighting device 100 at flat surfaces such as inner door moldings. The transverse transport section 300 with its two broad sides 320, 330 extends in a tangential plane relative to the longitudinal transport section 200. The longitudinal transport section 200 is connected to the first narrow side 350 of the transverse transport section 300 at the light exit section 230.

The particular formation of the transverse transport section 300 on the longitudinal transport section 200 has no effect on the illumination of the interior space, since the exit of light from one of the broad sides 320, 330 is not thereby adversely affected.

FIG. 1d shows a further embodiment of the lighting device 100 according to the invention. In this design, not only is the light coupled into the longitudinal transport section 200 via the first light entry surface 210, but the light from an additional light source 204 is also coupled via an additional light entry surface 209 that is associated with a supply arm 201. The supply arm 201 at its end opposite the light entry surface 209 is connected to the longitudinal transport section 200. The arrangement at the first light entry surface 210 is illustrated here strictly by way of example. Such an arrangement may take place in addition to each of the light entry surfaces 211, 212, and 213. This allows the light coupling to be designed with the objective of an efficient light intensity, which in turn enhances the homogeneous appearance. The light may already undergo one or more internal total reflections in the supply arm 201, and may be well intermixed when an RGB LED is used.

For simplification of the illustration, in the discussion below the longitudinal transport section 200 is illustrated as a circular cylindrical cord. Regardless, the various designs of the geometric embodiments stated above as examples are possible.

Figure 2:
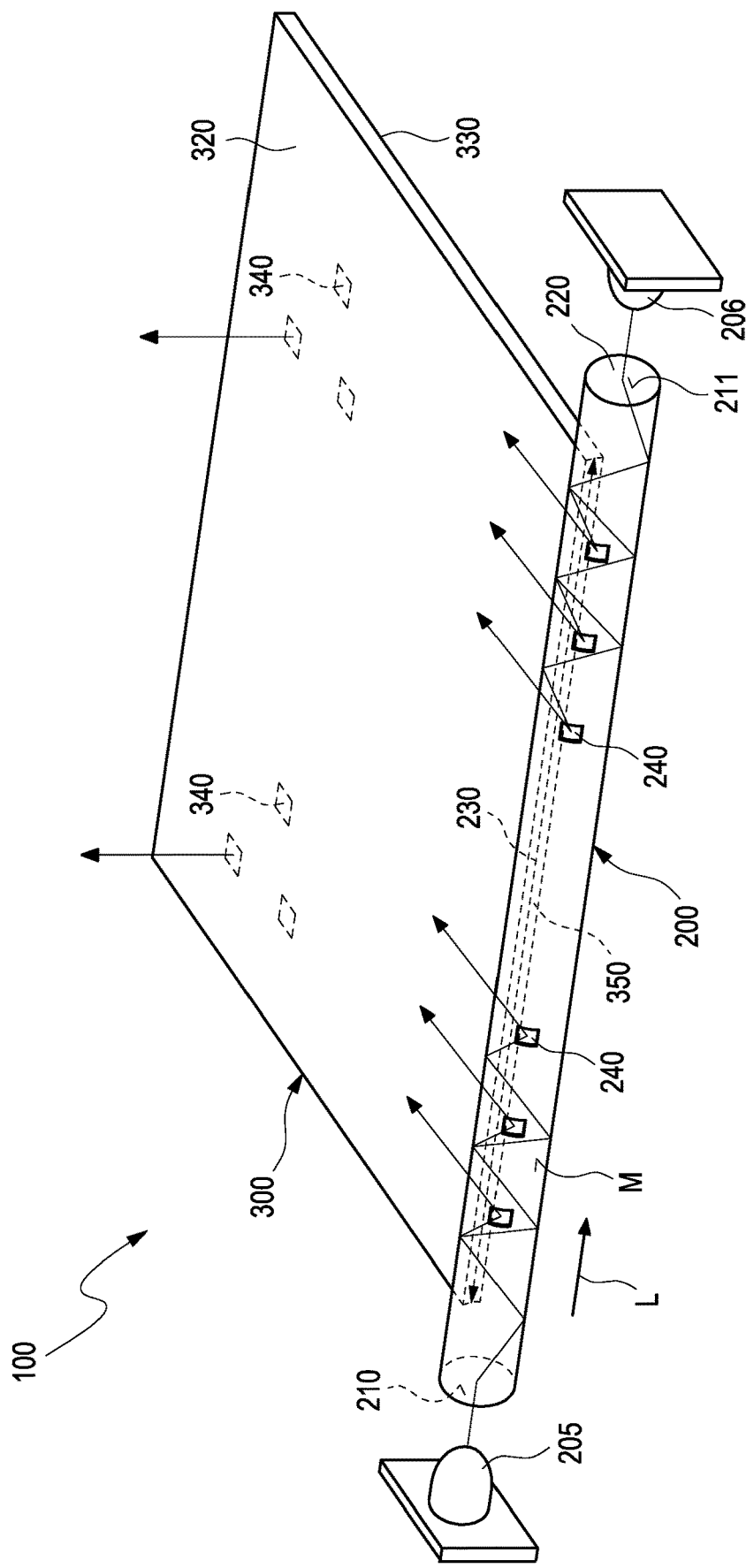
FIG. 2 shows a further embodiment according to FIG. 1 with a beam path.

FIG. 2 shows a further exemplary embodiment in which a second light entry surface 211 with an associated second light source 206 is situated in the end region 220 of the first longitudinal transport section 200. The light is coupled into the light entry surface 211, opposite the longitudinal extension L, and propagates as previously explained in the description of the figures for FIG. 1, under the conditions of total reflection. As a result of a second light source 206 being situated at the longitudinal transport section 200, the light pattern acquires a dynamic behavior which may be advantageously utilized for the interior space illumination. The schematically illustrated pattern of the light shows a decoupling of the light in the light exit section 230, from the longitudinal transport section 200 into the transverse transport section 300. Primary deflection elements 240 that bring about a more intense passage of light from the longitudinal transport section 200 into the transverse transport section 300 may be inlaid in the surface or in the volume of the longitudinal transport section 200. In the longitudinal extension L of the longitudinal transport section, these primary deflection elements 240 may be grouped at uniform distances from one another, or situated at nonuniform distances with a higher density with increasing distance from the light coupling surface. This results in a metered passage of light specifically in the starting region of the transverse transport section 300. FIG. 2 shows the first subsection of the longitudinal transport section 200 between the light coupling surface 210, 220 and the light exit section 230, and shows the second subsection along the light exit section 230 with the primary deflection elements 240. Since the first subsection does not have either primary deflection elements 240 or a light exit section 230, the color components of the RGB light are homogeneously mixed by total reflection at the circumferential surface.

When RGB diodes are used as a point light source, which with its individual colors is situated on a semiconductor chip, the light is emitted from three locations, for example, not from a single location. Overall, the RGB LED thus emits chaotic light into the longitudinal transport section 200, which uniformly mixes the coupled-in light, in particular via the first subsection. The light as homogeneous colored light thus passes from the longitudinal transport section 200 into the transverse transport section 300, and subsequently into the interior space to be illuminated.

By the use of multiple light sources, in the present case two light sources 205 and 206, at the one end of the longitudinal transport section 200 with the first light entry surface 210 and at the opposite end with the second light entry surface 211, interior lighting with enhanced quality results, wherein the quantity of light exiting from the transverse transport section 300 is predeterminable in the desired manner. This results in an optical effect that may be coordinated precisely with the ambience to be achieved.

The secondary deflection elements 340 may be designed as an engraved laser structure, as a printed pattern, or as discontinuities in the volume of the transverse transport section 300.

Figure 3:
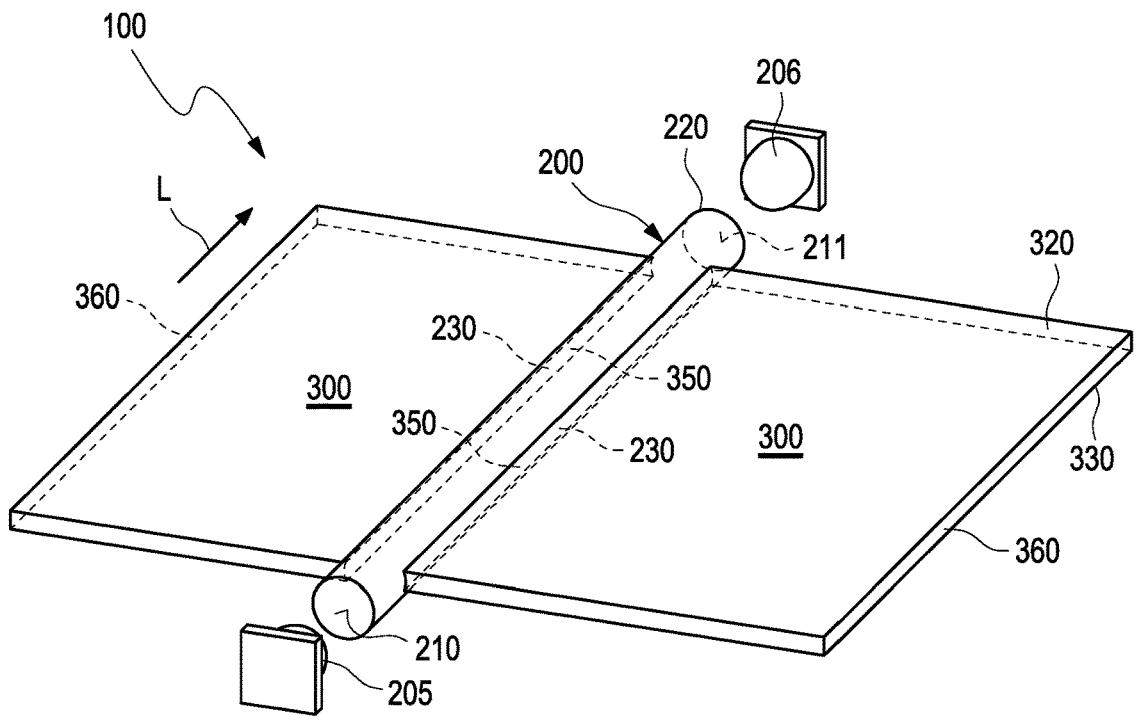
FIGS. 3a and 3b show further examples of the lighting device.
Figure 3:
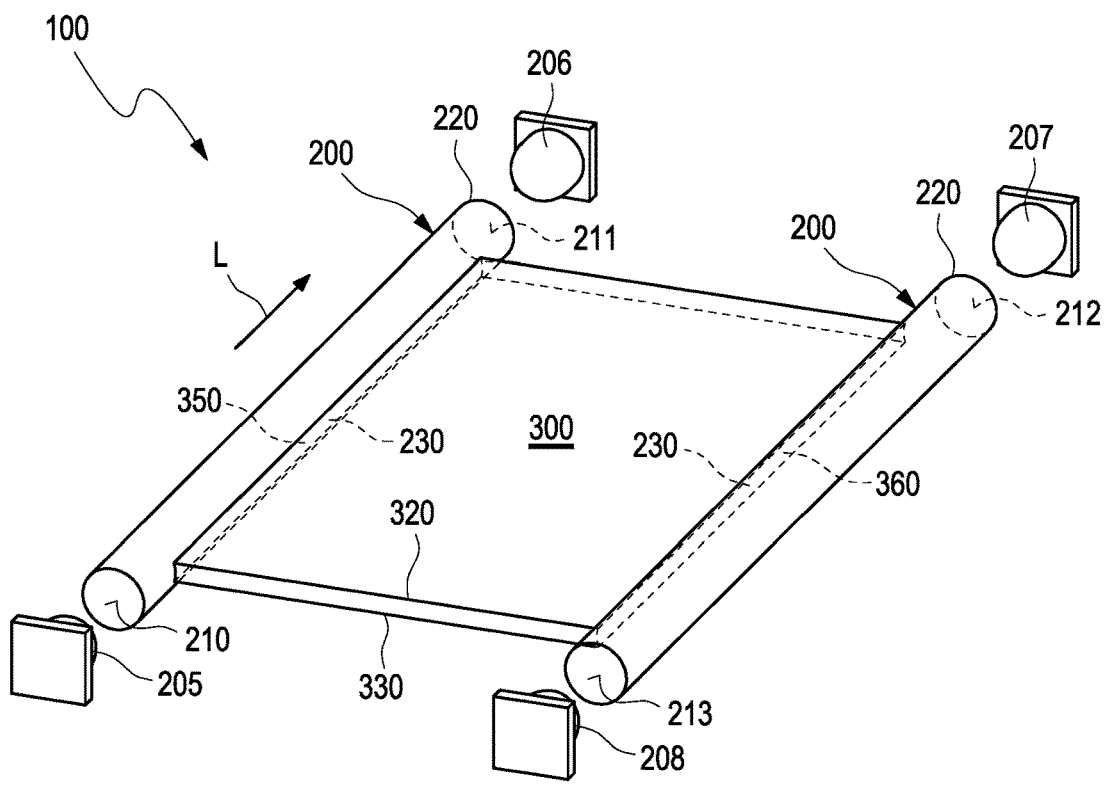

FIG. 3 illustrates further embodiments of the lighting device 1 according to the invention together with a light guide that includes at least one longitudinal transport section 200 and at least one transverse transport section 300. The longitudinal transport section 200 and the transverse transport section 300 may be arranged relative to one another in any desired manner.

FIG. 3a shows by way of example a longitudinal transport section 200 together with two transport sections 300 situated transversely with respect to the longitudinal extension L. The arrangement may be continued as desired, depending on the requirements for the interior space to be illuminated. In this exemplary embodiment, also by way of example two light entry surfaces 210, 211 with the associated light sources 205, 206, respectively, are situated at the longitudinal transport section 200.

FIG. 3b shows an arrangement of a transverse transport section 300 between two longitudinal transport sections 200. Each longitudinal transport section 200 has two light entry surfaces 210 through 213, each with a respective light source 205, 206, 207, and 208. In this preferred exemplary embodiment, the interior space is maximally illuminated when the light exits from the broad side, and only one connecting part is necessary for the four light sources. In this exemplary embodiment the light coupling may be designed differently than illustrated. Thus, one end may be designed, for example, as a reflecting mirror, or also with a supply arm 201.

Figure 4:
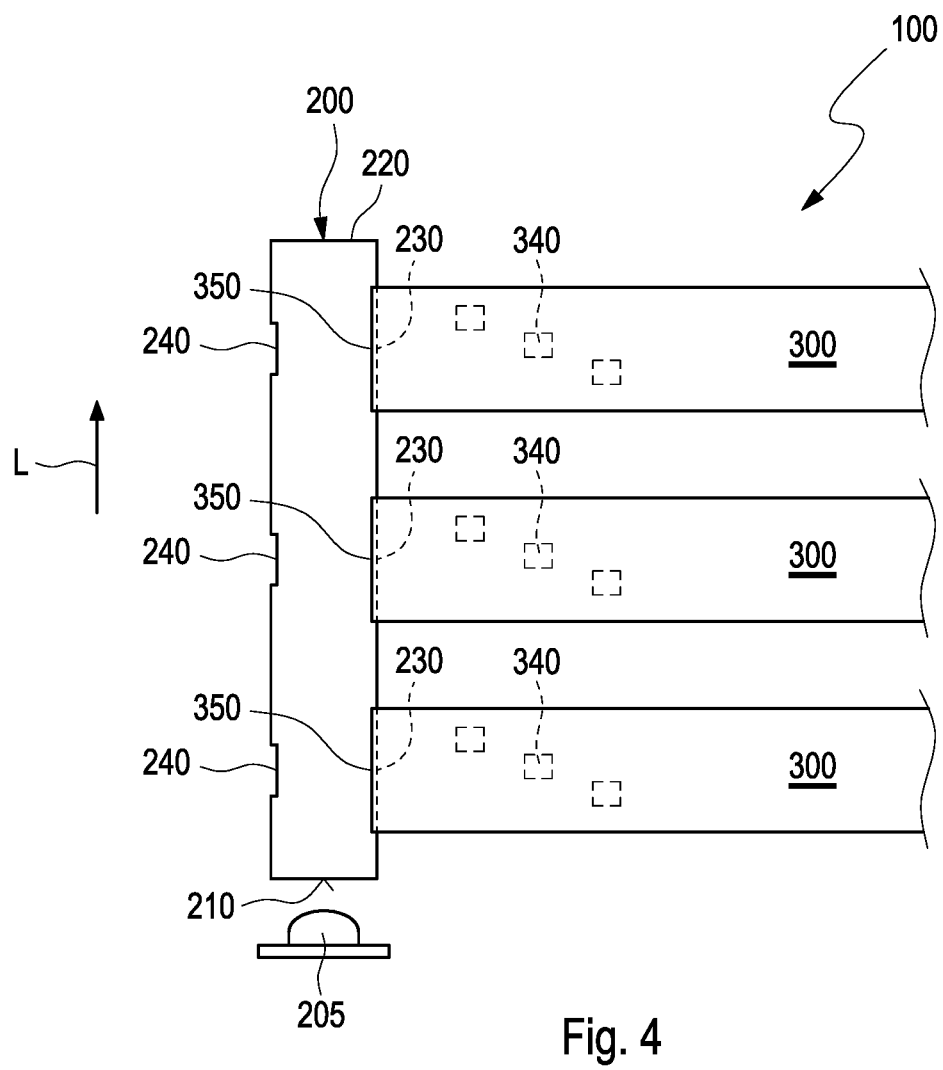
FIG. 4 shows a view of an example.

FIG. 4 illustrates a plurality of transverse transport sections 300. These multiple strip-shaped transverse transport sections 300 are situated in sections at the longitudinal transport section 200 in the longitudinal extension L, and protrude transversely from the longitudinal transport section. Each transverse transport section 300 is mounted on a light exit section 230 at which the light passes from the longitudinal transport section 200 into the transverse transport section 300. For a targeted light coupling into the strip-shaped transverse transport sections 300, the primary deflection elements 240 may be situated in the volume or at the circumferential surface M of the longitudinal transport section 200, at the circumferentially opposite side of the light exit regions 230. As mentioned above with reference to the description for FIG. 1, the strip-shaped transverse transport sections 300 may be injection-molded using the same material as for the longitudinal transport section, or as strip-shaped film sections may be laid into the injection mold before the at least one longitudinal transport section 200 is injection-molded. Low-cost 3D shaping is possible with this special embodiment, since the lighting device 100 with the transverse transport section 300 is flexibly adapted to the geometry or three-dimensional structure of the interior space of a vehicle.

Figure 5:
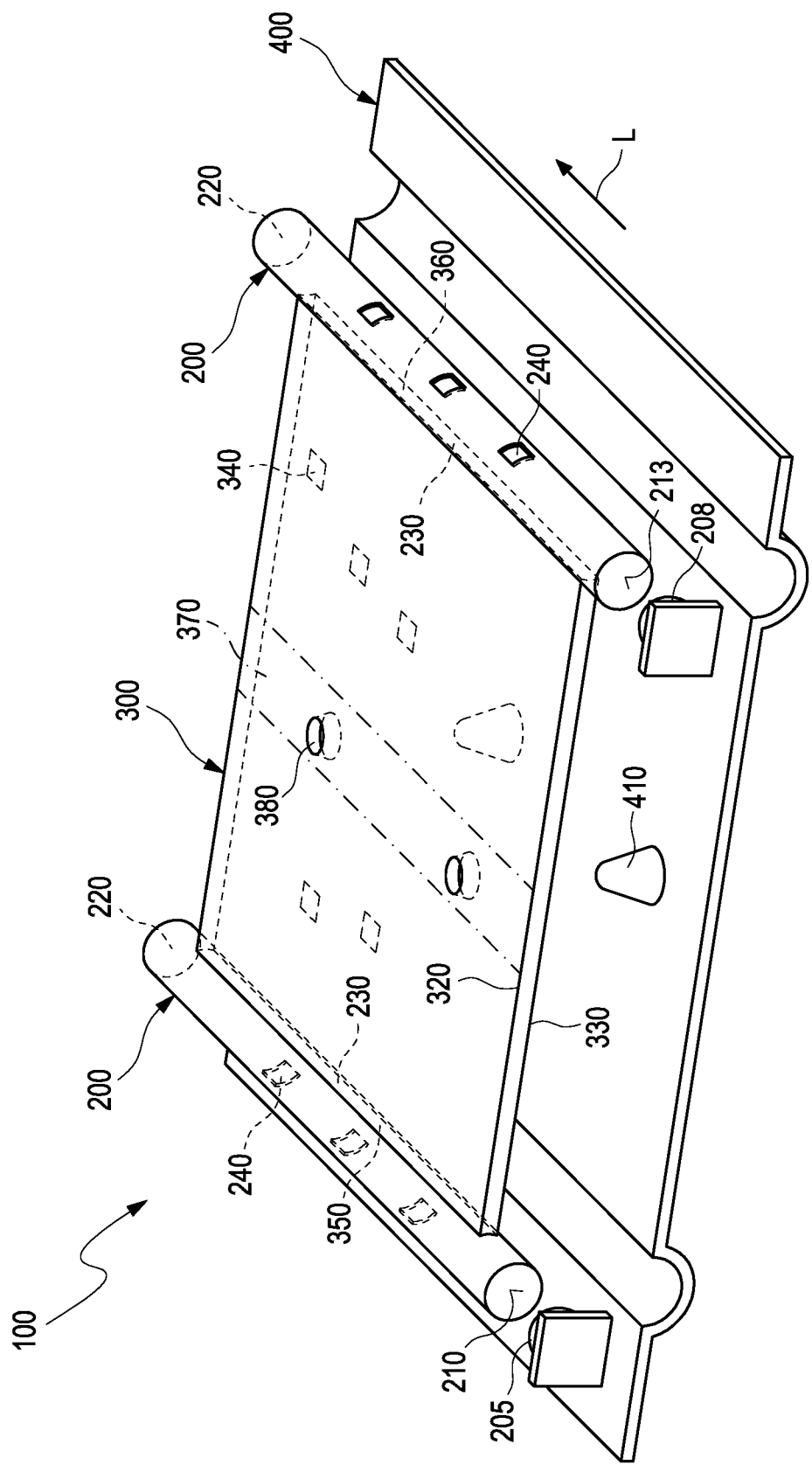
FIG. 5a shows a perspective view with central fastening.
FIG. 5b shows a perspective view with decentralized fastening.
Figure 5:
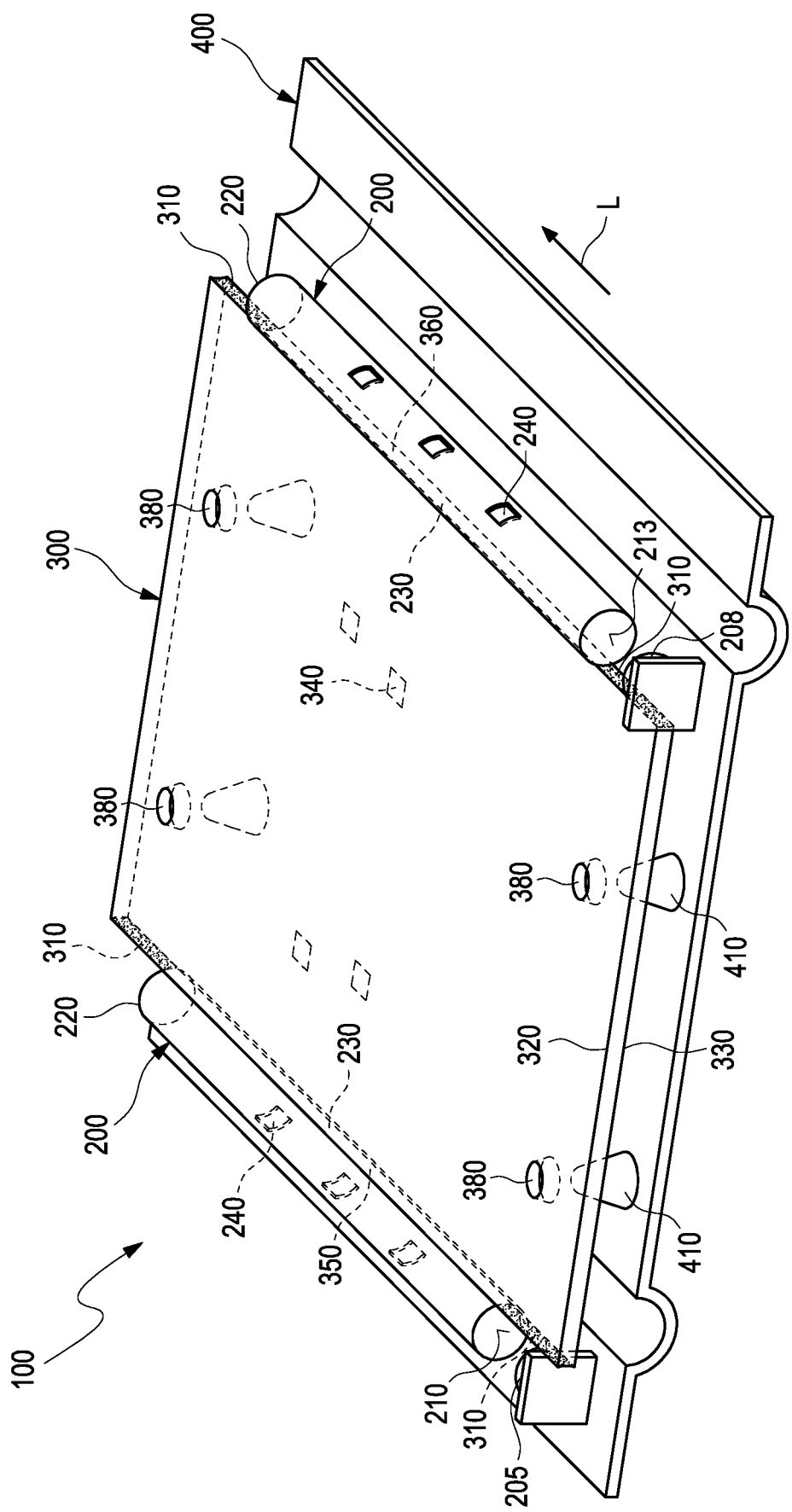

FIGS. 5a and 5b show exemplary embodiments of the lighting device 100 according to the invention, with two longitudinal transport sections 200 and a flat transverse transport section 300, which with its narrow sides 350, 360 is integrally molded in each case onto the longitudinal transport sections 200. The first light source 205 is situated at a first longitudinal transport section 200, and via the light entry surface 210 couples light into the longitudinal transport section 200. Light is coupled into the further longitudinal transport section 200 by means of a further light source 208. For this purpose, the longitudinal transport section 200 is designed with a further light entry surface 213. The light propagates by total reflection along the respective longitudinal transport section 200 and passes into the flat transverse transport section 300. In this exemplary embodiment as well, the passage of light may be controlled in a targeted manner by use of primary deflection elements 240, so that, for example, the passage of light takes place in only one light exit section 230. The light exit section 230 is schematically shown over the entire width of the narrow sides 350, 360. However, it may also be situated on a smaller area, for example only at the beginning of the light coupling, so that the light passes through in a targeted manner. The light enters into the transverse transport section 300 from two narrow sides 350, 360 and propagates between the broad sides 320, 330, likewise by total reflection, into the transverse transport section 300. The exit of light into the interior space to be illuminated is controlled by the secondary deflection elements 340.

FIG. 5a shows a form of fastening for the lighting device 100 according to the invention which causes very little interference in the light guidance process.

A support 400 is provided in order for the lighting device to be fastenable in the interior space of a motor vehicle, for example. The support 400 may also be designed as a reflector in order to achieve greater efficiencies and thus increase the illumination of the interior space. Central fastening elements 410 may be provided at the support 400, and the transverse transport section 300 may be fastened to the central fastening elements by clipping or welding, for example. The central fastening elements 410 may also be situated at the transverse transport section 300, using an injection molding process, for example, to achieve fastening to the support 400. To ensure a homogeneous and flat light distribution in the interior of the vehicle without the fastening interfering with the light guidance process, the central fastening elements 410 are connected to corresponding areas of the transverse transport section 300 that lie in a zone 370 in which the minimum light intensity prevails. This zone 370 is illustrated here by way of example as a narrow strip in the middle of the transverse transport section 300. However, the zone 370 may be situated at any given locations on the transverse transport section 300, either as one region or as multiple individual subregions. The region to be selected as the zone 370 for the fastening depends on the application, and may be determined by simulation of the light guidance process. Undesirable discontinuities that would have an adverse effect on the light guidance are thus avoided. The central fastening elements 410 are designed with a thickness with which they act as spacers between the support 400 and the transverse transport section 300. This results in an air gap, which due to its refractive index brings about the total reflection within the transverse transport section 300. The central fastening elements 410 may be designed as white or colored points, knobs, or ribs, which at the same time act as an adhesive without interfering with the light guidance process. The fastening may also be designed as a welded connection. If the central fastening elements 410 are situated at the transverse transport section and the complementary fastening elements 380 are situated at the support, the central fastening elements may already be mounted on the transverse transport section during the injection molding process. The pattern of the structure of the central fastening elements 410 may be uniform or irregular, depending on the requirements for the interior space to be illuminated. Regardless of the fastening, the structure and/or the pattern of the light decoupling may be individually adapted to the interior decor by means of the secondary deflection elements 340.

For fastening the lighting device 100 according to the invention, the transverse transport section 300 may be designed in such a way that in the longitudinal extension direction L of the longitudinal transport sections 200 it extends beyond the light exit section 230 with a fastening section 310 (see FIG. 5b). The fastening section 310 may also extend beyond the respective light entry surfaces 210, 213 and/or beyond the opposite end regions 220 in order to provide fastening of the lighting device 100 to these protruding areas, for example at a decorative support.

These forms of the fastening share the feature that the fastening areas 310 are situated outside of the light guidance, and thus have no interfering effect on the illumination or the light guidance process. The fastening areas 310 have a light-impermeable design. The transverse transport section 300 may be connected to other components, to the support 400 as illustrated here, by welding, adhesive bonding, or clipping. A connection by clipping the central fastening elements 410 and the fastening elements 380 cooperating therewith is only schematically shown. Due to the arrangement according to the invention of the fastening areas 310, the fastening of the lighting device 100 does not involve a loss of the light intensity.

FIG. 6 schematically illustrates further options for the fastening, depending on the particular requirements or lighting application.

A reflector 400 is situated at a broad side 330 in order to achieve higher efficiencies. For a thin housing, use of a thin film as a highly reflective reflector 400 is meaningful. If this reflector 400 is adhesively bonded to the broad side 330 of the transverse transport section 300 over the entire surface, the total reflection behavior in the transverse transport section 300 ceases, and the light does not propagate as desired between the first broad side 320 and the second broad side 330. As explained above in the description for FIG. 5, when the support or reflector 400 is partially connected to the transverse transport section 300, a minimal air gap may still be present which does not adversely affect the total reflection.

FIG. 6b shows a light distribution that corresponds to a desired irradiation into the interior space. When the decentralized fastening elements 420 for the connection between the transverse transport section 300 and the reflector 400 are situated according to the desired light distribution, a secondary deflection element 340, which would have to be mounted on the first broad side 320 of the transverse transport section 300, is dispensed with. This dual function of the decentralized fastening elements 420, namely, acting as a connection and as an optical discontinuity such as a secondary deflection element 340, may be utilized in a targeted manner to obtain the desired light distribution pattern.

Figure 7:
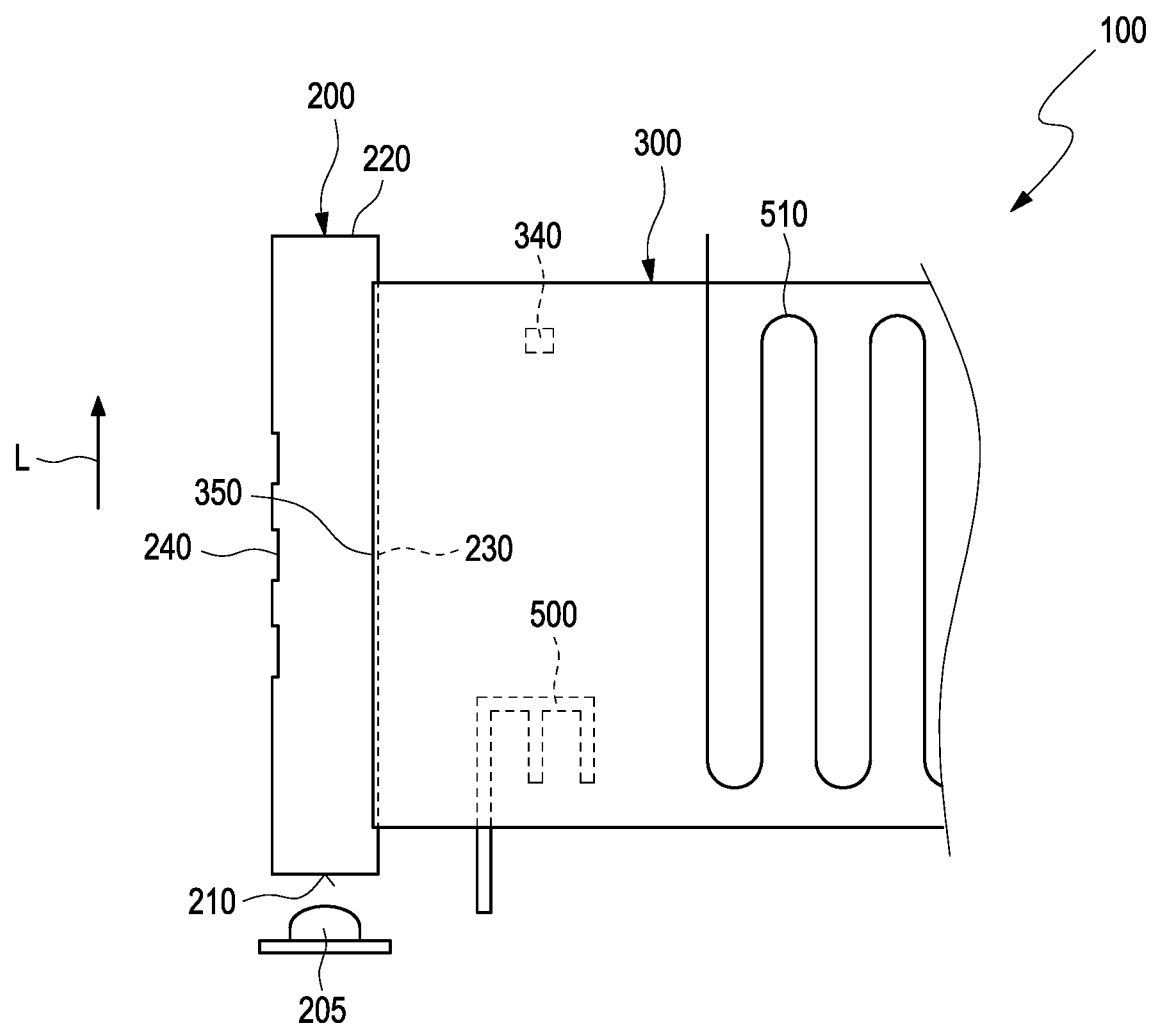
FIG. 7 shows a top view of the lighting device.

It is apparent in FIG. 7 how the lighting device 100 may be additionally used multifunctionally for flat surface or contour lighting. For this purpose, electronic components such as sensors 500 or heating wires 510 are situated in or on the transverse transport section 300. The sensors 500 may be designed for the touch-sensitive control of individual switch functions. An additional heating function may be enabled by either welding, fusing, or adhesively bonding a heating wire 510 to the transverse transport section 300. Alternatively, a thin heating wire may be applied using thin film technology, in particular using physical vapor deposition (PVD) coating. In addition, for such applications the heating wires 510 may be at least partially replaced by the thinner strip conductors applied using PVD technology.

These additional functions of the lighting device 100 are preferably integrated into electrically driven passenger vehicles in vehicle moldings such as inner door moldings, the center console, or also the vehicle roof. If the lighting device 100 is additionally used for heating the interior space, this contributes to an increase in the energy efficiency or an increase in the cruising range of the electrically driven vehicle, since the energy demand is lower than with conventional heating systems. In this multifunctional exemplary embodiment, advantages are provided by the small number of components and the reduced weight thus achieved.

Figure 8:
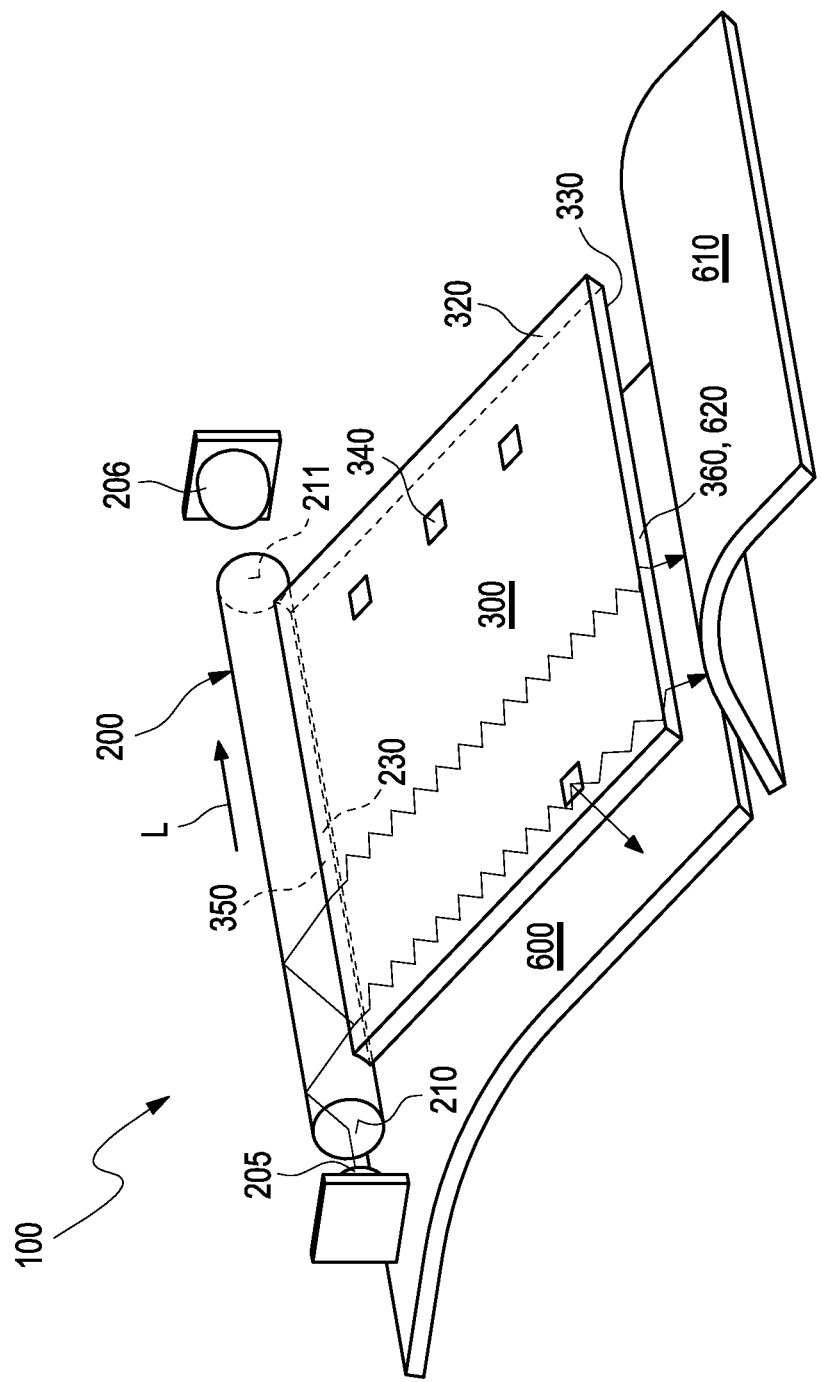
FIG. 8 shows the lighting device with a decorative layer.
Figure 9:
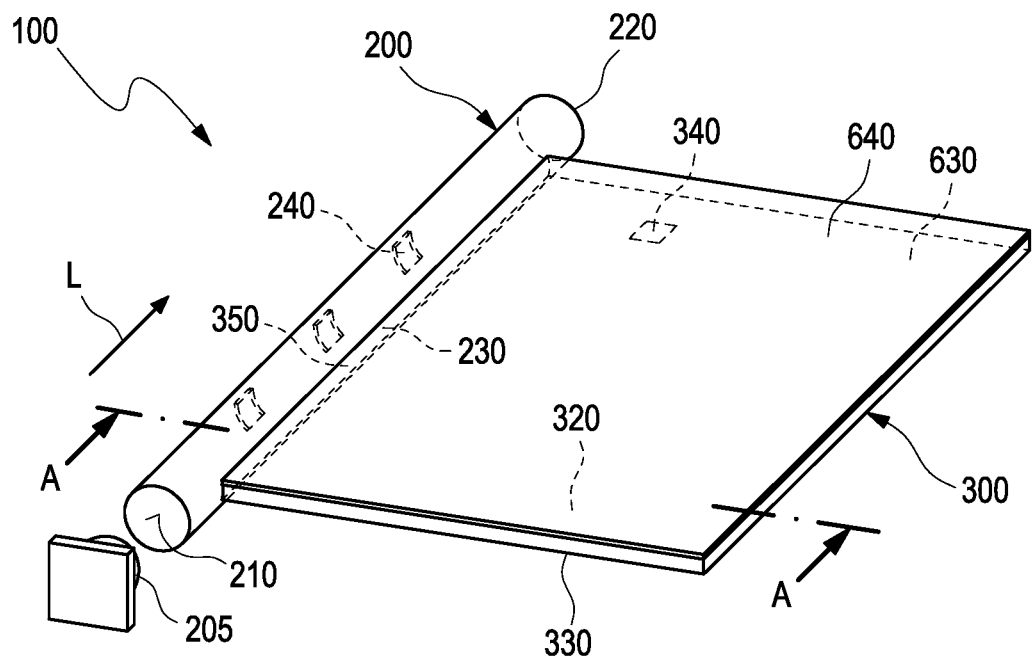
Figure 9:
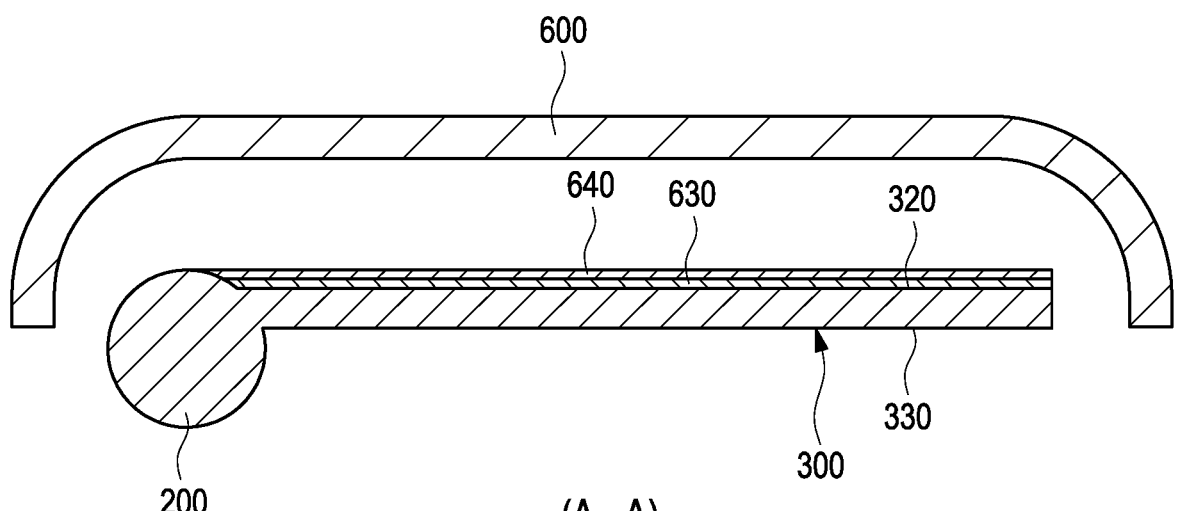

As is apparent from FIGS. 8 and 9, the lighting device 100 according to the invention may be used for further applications. As mentioned in the preceding description, the light from the light sources 205, 206 is coupled into the longitudinal transport section 200, and is decoupled into the transverse transport section 300 via a light exit section 230. The light decoupling may also take place in the longitudinal extension L on the other side of the longitudinal transport section 200, so that a longitudinal transport section 200 may supply two transverse transport sections 300 with light from the light sources 205, 206, which is not illustrated here. The light propagates between the broad sides 320, 330 by total reflection. As previously described for the secondary deflection elements 340, the light is refracted and exits at a broad side, for example to backlight a decorative layer 600. The residual light that arrives at the second narrow side 360 of the transverse transport section 300 may be used not only for contour lighting of this narrow side 360, but also for illuminating a decorative element 610. For this purpose, the residual light at the light passage section 620 is decoupled from the transverse transport section 300 and coupled into the decorative element 610.

FIGS. 9a and 9b show the lighting device 100, which is situated behind an unstructured decorative support or which backlights a transparent first decorative element 600. A first layer 630 including partially light-impermeable areas and a second layer 640, which is designed as a metal layer, for example, is applied to the broad side 320 of the transverse transport section 300. In the unilluminated state a metallic effect behind the decorative layer 600 is visible to the observer, and only when the lighting device 100 radiates light is the desired pattern, generated by the first layer 630, visible.

Figure 10:
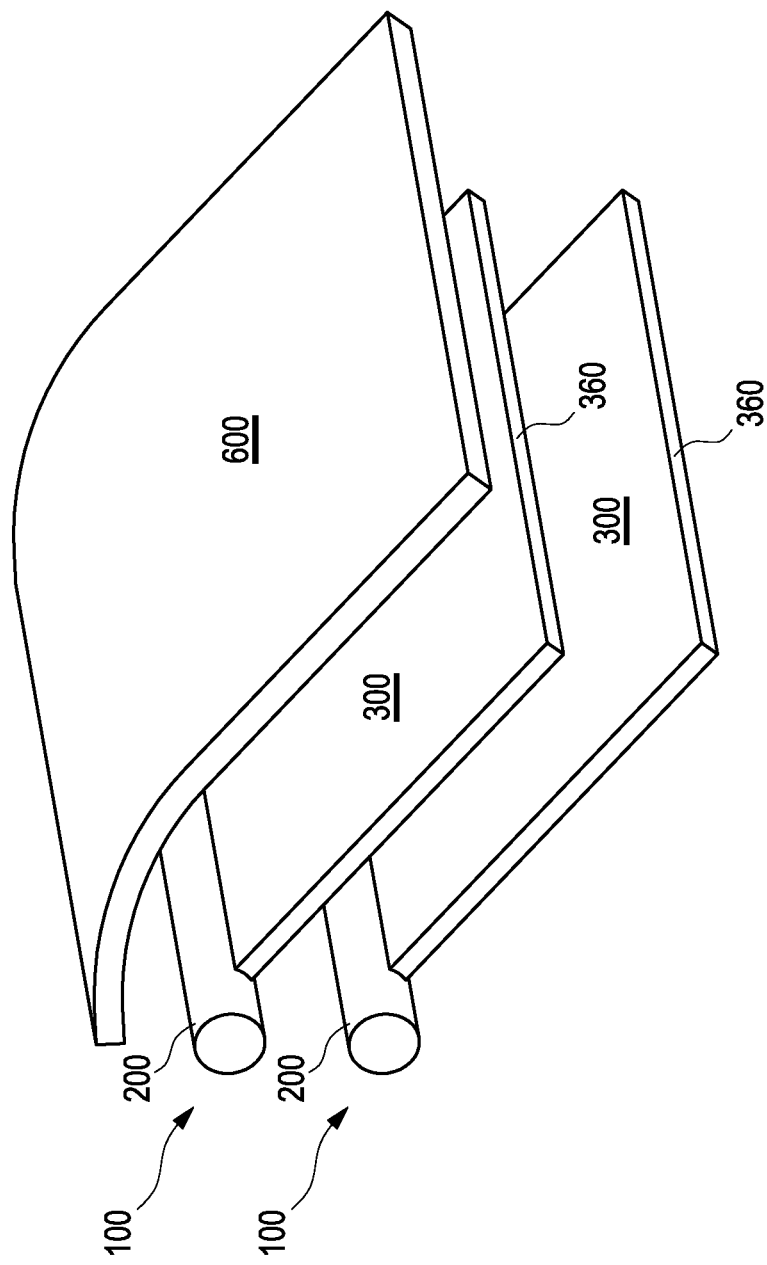
FIG. 10 shows a perspective illustration of one alternative embodiment.

A further preferred embodiment is illustrated in FIG. 10. Two lighting devices 100 are situated one on top of the other in such a way that a combination of contour lighting and surface lighting results. The second narrow side 360 of the one lighting device 100 is designed as contour lighting, so that light exits and the observer discerns a light strip. The second lighting device 100 flatly backlights the decorative layer 600.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device to illuminate an interior space, the lighting device comprising:
   a light guide with at least one longitudinal transport section and at least one transverse transport section to guide light,
   wherein the at least one longitudinal transport section has at least one light entry surface, arranged transversely with respect to a longitudinal extension of the at least one longitudinal transport section, for coupling light of at least one light source into the at least one longitudinal transport section, and along the longitudinal extension has at least one light exit section,
   wherein the at least one transverse transport section has a flat design with a first broad side, a second broad side opposite the first broad side, and narrow sides,
   wherein the at least one longitudinal transport section has a circumferential surface at which the coupled-in light is guided in the longitudinal extension via substantially total reflection in the at least one longitudinal transport section, the light coupling into the at least one transverse transport section via the at least one light exit section, and being guided in the at least one transverse transport section, between the first and second broad sides of the at least one transverse transport section, by substantially total reflection, wherein the at least one transverse transport section has secondary deflection elements at which the light that is coupled into the at least one transverse transport section is deflected such that the light exits from a surface, spanned by the flat transverse transport section, at least one of the first or second broad sides, wherein a first narrow side of the at least one transverse transport section connected to the at least one longitudinal transport section along the longitudinal extension at the at least one light exit section, wherein the at least one longitudinal transport section and the at least one transverse transport section are formed as one piece and are made of a same material, wherein a length of the longitudinal transport section is greater than a length of the first narrow side of the at least one transverse transport section, with respect to the longitudinal extension, such that a length of the light exit section, with respect to the longitudinal extension, is smaller than the length of the longitudinal transport section, the light exit section thereby having a first end and a second end, the first end being positioned closer to the at least one light entry surface than the second end, wherein the at least one longitudinal transport section has a first subsection and a second subsection that is connected in series with the first subsection, wherein the first subsection extends, with respect to the longitudinal extension, from the at least one light entry surface to the first end of the light exit section, wherein the second subsection extends, with respect to the longitudinal extension, from the first end of the light exit section to the second end of the light exit section, and wherein the first subsection is designed as a supply line section with the circumferential surface, at which the light coupled into the supply line section via the at least one light entry surface is guided by total reflection such that the light is relayed into the second subsection, and from there passes through the light exit section and into the at least one transverse transport section.

2. A lighting device to illuminate an interior space, the lighting device comprising:
a light guide with at least one longitudinal transport section and at least one transverse transport section for guiding light;
wherein the at least one longitudinal transport section has at least one light entry surface arranged transversely with respect to a longitudinal extension of the at least one longitudinal transport section for coupling light of at least one light source into the at least one longitudinal transport section, and along the longitudinal extension has at least one light exit section,
wherein the at least one transverse transport section has a flat design with a first broad side, a second broad side opposite the first broad side, and narrow sides,
wherein the at least one longitudinal transport section has a circumferential surface at which the coupled-in light is guided in the longitudinal extension via total reflection in the at least one longitudinal transport section, the light coupling into the at least one transverse transport section via the at least one light exit section, and being guided in the at least one transverse transport section, between the first and second broad sides of the at least one transverse transport section, by total reflection,
wherein the at least one transverse transport section has secondary deflection elements at which the light that is coupled into the at least one transverse transport section is deflected such that the light exits from a surface, spanned by the flat at least one transverse transport section, at least one of the first or second broad sides,
wherein a first narrow side of the at least one transverse transport section is connected to the at least one longitudinal transport section along the longitudinal extension at the at least one light exit section, and the at least one transverse transport section is designed as a flat film and is integrally formed on the at least one longitudinal transport section.

3. A lighting device to illuminate an interior space, the lighting device comprising:
a light guide with at least one longitudinal transport section and at least one transverse transport section to guide light,
wherein the at least one longitudinal transport section has at least one light entry surface, arranged transversely with respect to a longitudinal extension of the at least one longitudinal transport section, for coupling light of at least one light source into the at least one longitudinal transport section, and along the longitudinal extension has at least one light exit section,
wherein the at least one transverse transport section has a flat design with a first broad side, a second broad side opposite the first broad side, and narrow sides,
wherein the at least one longitudinal transport section has a circumferential surface at which the coupled-in light is guided in the longitudinal extension via substantially total reflection in the at least one longitudinal transport section, the light coupling into the at least one transverse transport section via the at least one light exit section, and being guided in the at least one transverse transport section, between the first and second broad sides of the at least one transverse transport section, by substantially total reflection,
wherein the at least one transverse transport section has secondary deflection elements at which the light that is coupled into the at least one transverse transport section is deflected such that the light exits from a surface, spanned by the flat transverse transport section, at least one of the first or second broad sides,
wherein a first narrow side of the at least one transverse transport section is connected to the at least one longitudinal transport section along the longitudinal extension at the at least one light exit section,
wherein the at least one longitudinal transport section and the at least one transverse transport section are formed as one piece and are made of a same material, and
wherein the at least one transverse transport section includes multiple spaced-apart transverse transport sections arranged in a strip shape and that are arranged at the at least one longitudinal transport section in the longitudinal extension.

4. The lighting device according to claim 1, wherein the at least one transverse transport section is arranged in a radial plane relative to a center axis of the at least one longitudinal transport section or is arranged in a tangential plane relative to the circumferential surface of the at least one longitudinal transport section.

5. The lighting device according to claim 1, wherein the at least one light source is a single-color or multi-color LED or an RGB LED.

6. The lighting device according to claim 1, wherein the at least one light entry surface includes a first light entry surface and a second light entry surface and the at least one light source includes a first light source and a second light source, wherein the first light source is arranged at the first light entry surface, and the second light source is arranged at the second light entry surface in the longitudinal extension on an end side of an end region of the at least one longitudinal transport section for coupling light, or wherein the end region is a reflecting mirror.

7. The lighting device according to claim 1, wherein the at least one longitudinal transport section has the at least one first light entry surface with the at least one light source associated thereto and has a supply arm having a first end at which an additional light entry surface with an additional light source associated thereto is arranged, and wherein a second end of the supply arm merges into the at least one longitudinal transport section.

8. The lighting device according to claim 1, wherein the at least one longitudinal transport section has primary deflection elements at which the light that is guided in the at least one longitudinal transport section is deflected such that the light couples into the at least one transverse transport section via the at least one light exit section.

9. The lighting device according to claim 8, wherein the primary deflection elements are arranged at the circumferential surface of the at least one longitudinal transport section at a circumferentially opposite side of the at least one light exit section, and wherein the primary deflection elements have a higher density with increasing distance from the light coupling surface.

10. The lighting device according to claim 1, wherein the at least one longitudinal transport section in the longitudinal extension has a cross-sectional change such that the cross section continuously decreases toward an end region, or decreases up to a predetermined location and at the end region once again increases, or has a tapered design only in the end region.

11. The lighting device according to claim 1, wherein a further longitudinal transport section is arranged at a second narrow side of the at least one transverse transport section that is opposite the first narrow side, the further longitudinal transport section having at least one further light entry surface arranged transversely with respect to a longitudinal extension of the further longitudinal transport section, for coupling light of at least one further light source into the further longitudinal transport section, and along the longitudinal extension, the further longitudinal transport section has at least one light exit section that is connected to the second narrow side of the at least one transverse transport section.

12. The lighting device according to claim 1, wherein the at least one transverse transport section has fastening elements that cooperate with central fastening elements of a support in such a way that the at least one transverse transport section and the support are connectable to one another in a zone of the at least one transverse transport section having a low light intensity distribution.

13. The lighting device according to claim 1, wherein the at least one transverse transport section or a support has decentralized fastening elements so that the at least one transverse transport section and the support are mechanically and integrally fixedly joinable to one another.

14. The lighting device according to claim 13, wherein at least one of the decentralized fastening elements is designed in the form of one of the secondary deflection elements.

15. The lighting device according to claim 1, wherein electronic components or at least one sensor and a heating wire are arranged in and/or at the at least one transverse transport section.

16. The lighting device according to claim 1, wherein at least one of the first or second broad sides of the at least one transverse transport section has a light exit surface that is coated with a first layer, which for generating a light pattern, is light-permeable in areas, and wherein the first layer at a side facing away from the light exit surface of the at least one transverse transport section is coated with a second layer made of a metallic-looking material that has a light-permeable design and covers light-permeable areas of the first layer.

17. An interior fitting part comprising the lighting device according to claim 1, wherein a surface of the interior fitting part facing the vehicle interior, in a position of use, has at least one decorative layer that is light-permeable in areas, and wherein for backlighting the at least one decorative layer, the at least one transverse transport section is arranged at a rear side of the decorative layer facing away from the vehicle interior.

18. The interior fitting part according to claim 17, wherein the at least one decorative layer comprises a fabric, and is designed as a textile layer, or wherein the at least one decorative layer is designed as a perforated leather layer or synthetic leather layer.

19. The interior fitting part according to claim 17, wherein the interior fitting part is a side wall for a vehicle interior.

* * * * *